Jan. 20, 1948.  J. M. VAN BEUREN ET AL  2,434,822
BALANCED ALTERNATING CURRENT EXCITED VACUUM TUBE METER
Filed July 8, 1944  2 Sheets-Sheet 1
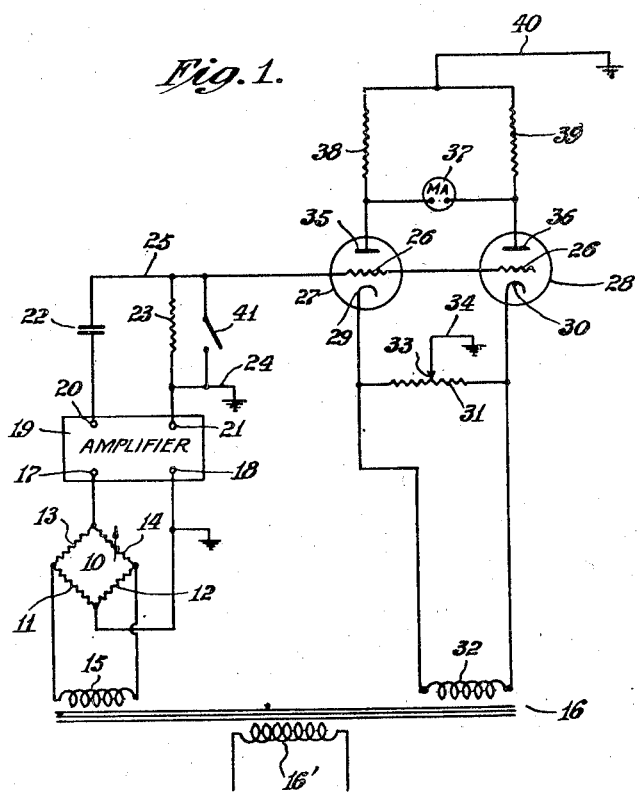
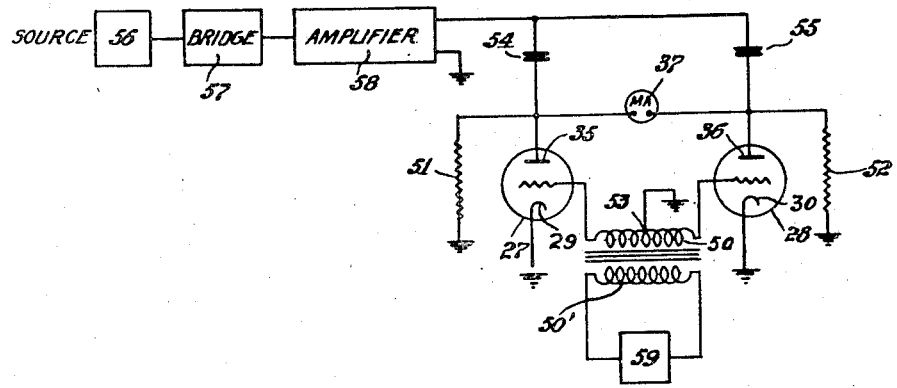
INVENTORS
John M. van Beuren
Elton Conrad
BY
Roger Williams
ATTORNEY Jan. 20, 1948. J. M. VAN BEUREN ET AL 2,434,822
BALANCED ALTERNATING CURRENT EXCITED VACUUM TUBE METER
Filed July 8, 1944 2 Sheets-Sheet 2

INVENTORS
John M. van Beuren
Elton Conrad
BY
Roger Williams
ATTORNEY

Patented Jan. 20, 1948

2,434,822

UNITED STATES PATENT OFFICE 2,434,822

BALANCED ALTERNATING CURRENT EXCITED VACUUM TUBE METER

John M. van Beuren, Morristown, and Elton Conrad, Boonton, N. J., assignors to Measurements Corporation, Boonton, N. J., a corporation of New Jersey Application July 8, 1944, Serial No. 544,122

4 Claims. (Cl. 171—95)

This invention relates to an electrical indicating device adapted for use in connection with measuring electrical currents of relatively low value, especially alternating currents.

One purpose of this invention is to provide an indicating instrument adapted to be substituted in lieu of a dynamometer type of indicator, for example in connection with such measurements as are made with Wheatstone bridges or direction-finding apparatus.

Instruments of the dynamometer type are subject to the difficulties of being comparatively fragile, or of lacking sensitivity if they are made to be more rugged. Another difficulty with such types of instruments is that when their characteristic response curve is made to have a sufficiently great slope at the point of null indication, the instrument likewise is very responsive to overloading, and easily damaged by such overload.

Another purpose of this invention is to provide an indicating instrument which will present a characteristic curve having a steep slope at the null point, while at the same time this characteristic curve flattens off when the null point has been passed by a moderate degree, thus avoiding the danger of overloading the actual meter employed therewith.

Another purpose of this invention is to provide an indicating instrument of the type described which can be employed at relatively high frequencies, extending into the region of megacycles.

Reference is now made to the accompanying drawing where—

Fig. 1 represents one embodiment of this invention where the current to be measured feeds the grids of electronic tubes at the indicating instrument.

Fig. 2 represents another form of this invention where the current to be measured feeds the anodes of electronic tubes at the indicator.

Figure 3:
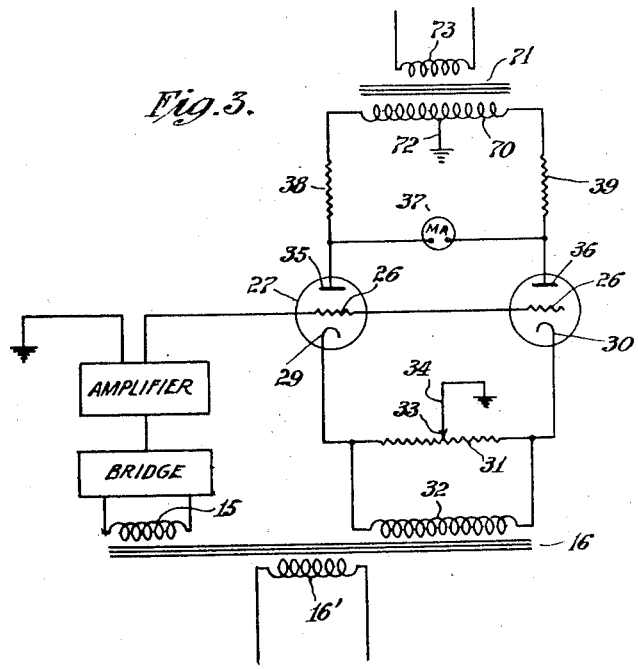
Fig. 3 represents another form of this invention, adapted for use with a less sensitive type of meter.

Referring now especially to Fig. 1, this device is here shown as used in conjunction with a Wheatstone bridge indicated at 10, having two arms, 11 and 12, preferably of equal impedance, an unknown impedance at 13, and a variable balancing impedance at 14. The energy feeding the bridge is derived from a winding 15, here indicated as the secondary winding of a transformer 16. The output of the bridge is fed to the input terminals 17 and 18, of an electronic amplifier 19. This amplifier is preferably so constructed that the output thereof will have the same phase as the input. The output terminals 20 and 21 of this amplifier are connected via coupling condenser 22 to a discharge resistor 23. One terminal of this resistor is grounded at 24, and the other terminal 25 is connected to the grids 26 of two electronic tubes 27 and 28, so that these grids are connected in parallel with one another.

Electronic tubes 27 and 28 are here shown as of the triode type, but other types of tubes may be substituted therefor, by making such suitable alterations as will be familiar to one skilled in the art. The cathodes 29 and 30 may be heated from any suitable source (not shown) and are connected to the terminals of a suitable balancing resistance 31, and also to the terminals of a secondary winding 32, here shown as a portion of transformer 16. The energy serving to feed transformer 16 may be derived from any suitable source and fed to a suitable primary winding, here indicated at 16'. Resistor 31 is provided with a variable mid-tap 33, connected to a ground 34, the purpose of which will hereinafter be explained.

Tubes 27 and 28 contain anodes 35 and 36 respectively. Shunted between these anodes is the meter proper 37 of the indicator, which may be a sensitive direct current meter, such as a milliammeter. It is preferable that this meter be provided with a center null point, so that indications may be read with current flowing therethrough in either direction. Anodes 35 and 36 are connected respectively through resistors 38 and 39 to a ground point 40. These resistors are so chosen as to have substantially identical values of resistance.

The device in Fig. 1 operates as follows. The windings 15 and 32 are respectively supplied with alternating currents which should, in the case of both windings, be of frequencies which are either identical or harmonically related to one another. Likewise, for the best results, these two currents should be in phase with one another. In order to obtain the relationship of currents just described, windings 15 and 32 may conveniently be placed as shown, upon a common transformer, but this showing is purely illustrative and the two windings may be fed from unrelated sources, provided that the respective currents derived from such sources bear to one another the relationships above described.

Wheatstone bridge 10 has been shown as one possible form of measuring device which may be used in connection with this invention. However, it is to be understood that other measuring devices may be employed in the general position occupied by the Wheatstone bridge here shown, the essential requirement being that it can be arranged that the output of such measuring devices shall be identical in phase and frequency with the input. Amplifier 19 may be of any suitable type. For example, a two-stage amplifier having a gain of about 1000 has been found suitable for use with a Wheatstone bridge, when the input of the bridge is of an order of magnitude of about 0.2 volt.

When tubes of types such as 6J5, 6C5, etc., are employed, a potential of about 6 volts has been found suitable for winding 32. When adjustable midtap 33 effectively grounds the center point of this winding, there will exist a potential of approximately 3 volts between the cathodes of the two tubes and the ground. In lieu of resistor 31 and midtap 33, transformer winding 32 may have a suitable midtap provided.

The anodes of the two tubes, being grounded through resistors 38 and 39, will then be at a maximum instantaneous potential of approximately 3 volts with respect to the cathodes of the tubes. However, the flow of current through resistors 38 and 39 will reduce such potential to an even lower value. In adjusting this indicator, it is preferred to supply a switch 41 which will directly ground the grids 26 at the point 24. With these grids grounded, midtap 33 is adjusted until meter 37 gives a null indication. This adjustment is provided in order to balance out the inequalities between the two tubes and the anode resistors, which inequalities inevitably will be found to exist, in practice. For the best results, it is preferable that tubes 27 and 28 be chosen to exhibit substantially identical electrical characteristics.

When switch 41 is open, any alternating current potential fed by bridge 10 to amplifier 19 will appear between grids 26 and ground 24. Since these grids are in parallel, such grid input must of necessity be in phase with the anode potential in one tube, and therefore must be out of phase with the anode potential of the other tube. This will give rise to an unbalanced condition between the two anodes and thus will cause meter 37 to indicate in one direction or the other, according to the relative direction of phase shift. If bridge 10 be balanced to give the desired measurement by null balance, current will no longer be fed to grids 26 and meter 37 will again show a null indication, thus indicating that bridge 10 has been balanced. One important advantage of this device is that meter 37 not only shows departure from the desired balanced condition of the measuring device itself, but will indicate by the direction in which it moves from the null point, the sense or direction in which the measuring device departs from balance.

Referring now to Fig. 2, there is here shown an indicating device employing two balanced tubes and having the current to be indicated fed to the anodes of the two tubes connected in parallel with one another. The meter proper is likewise between the two anodes. The grids of the two tubes are fed in push-pull fashion from a suitable transformer winding 50, the mid-point 53 of which is grounded, while the anodes are grounded through resistors 51 and 52. The current to be indicated is isolated, with respect to direct current potentials, from the two anodes by means of isolation condensers 54 and 55. In this figure, the source of alternating current feeding the measuring device proper is indicated at 56, while the measuring device itself is shown at 57 and the amplifier at 58. All these elements can be similar to those shown in Fig. 1. Likewise, winding 50 may receive energy from any suitable source 59 via primary winding 50'. In this case also, there must exist between sources 56 and 59 the same predetermined relationships of phase and frequency as have been described in connection with Fig. 1.

The device shown in Fig. 2 operates in a manner very similar to that in which the device shown in Fig. 1 operates. However, in this case, the grids undergo uniform alternation of phase, while the current to be indicated causes the anodes to change their instantaneous potential so as to be in phase with one another. Unbalanced conditions, which occur when current is fed to the two anodes in this manner, cause the meter to indicate by moving to the left or right respectively of the null point, this movement indicating not only the presence of a current which is measured, but also indicating the phase thereof, with respect to the currents derived from sources 56 and 59.

The indicating device shown in Fig. 3 likewise employs the fundamental circuit described in connection with Fig. 1 and similar elements bear identical reference numerals. In the case of this form of device, winding 32 is designed to supply to balancing resistor 31 just sufficient voltage properly to bias the anodes of the two tubes. The current to be measured is fed to the grids of the two tubes, connected in parallel with one another, and the indicating meter proper is shunted between the anodes. In this form, however, the current for the anodes is derived through resistors 38 and 39 from a suitable source 70, here indicated as the secondary winding of a transformer 71. This winding is grounded at the mid-point 72 and primary winding 73 of this transformer is energized from a source carrying current of identical or harmonically related frequency, with the current exciting windings 15 and 32.

The operation of the form shown in Fig. 3 is practically identical with that of the form shown in Fig. 1, the principal advantage of the form of Fig. 3 being that the supply to the anodes of a voltage separate from that used to bias the cathodes, allows the employment at 37 of a larger, and consequently more rugged meter.

With all forms of indicating device according to this invention, it is necessary that any changes in the current to be measured shall occur at a rate which will not be more than a fraction of the frequency of the alternating current used to energize the indicating device. Since there is practically no limit to the frequency which may be used for such energization, this limitation will rarely be found to be a serious one.

Due to the possibility of employing high frequencies with this indicating device, the field of possible applications for the device is greatly extended. For example, it may be used in many cases where it has hitherto been necessary to employ a cathode ray oscillograph. One example of such use is the balancing of circuits carrying radio frequency currents, such as circuits employed with multiple antennae and the like.

Still another advantage of this measuring device is that it may be employed for the indication or measurement of high frequency currents derived from sources where undesired strays or interfering signals are superimposed upon such currents. For example such currents may be those collected from a receiving antenna, where static may be present. When used for such measurement, this device tends to discriminate against the strays and static signals, since such signals occur with random phase and frequency relationships, thereby producing random movements of the indicating meter proper. As previously described, it is necessary that the current to be measured arrive at the two tubes with phase and frequency related to the phase and frequency of the local energy supply. Since strays or static signals would only by chance and only momentarily bear any definite relationships of the type just described, any effect produced by such strays upon meter 37 would, at the most, produce such random movements of the indicating element of the meter as could readily be distinguished from the comparatively steady indication of the meter caused by the currents of the measurement of which is desired.

Figure 4:
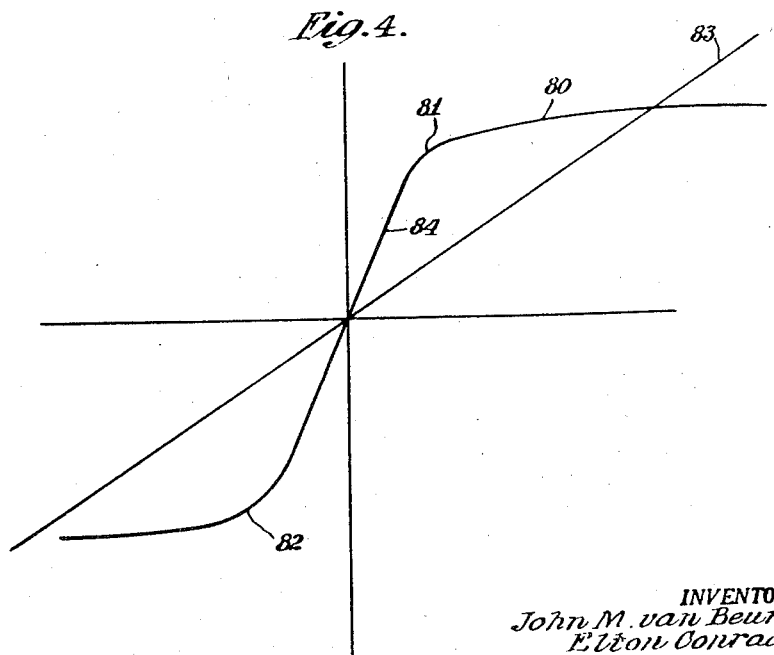
Fig. 4 represents a characteristic response graph of this indicating device, compared with a similar graph of a dynamometer type device.

In Fig. 4, a conventional representation, with Cartesian coordinates, is shown of the response close to the null point of this indicating device. Such response is indicated by curve 80. It will be seen that, close to the null point, the slope of this curve is extremely steep, thus indicating the sensitivity of this device used as a null indicator. At points 81 and 82, it will be seen that the curve flattens off and becomes substantially parallel to the horizontal axis, thus illustrating the action of this indicating device when subjected to overload. The flattening of the curve is due to the action of the two electronic tubes, to which the meter is connected. These tubes afford a "cushioning" effect, since the maximum value of current which may reach the anodes of the tubes is limited by resistors 38 and 39. These resistors are here shown as having a value of 15,000 ohms each, but such value is, of course, purely illustrative. In any case, the current flow through these resistors will of necessity be kept within a certain maximum value, with the employment of a predetermined voltage to supply the anodes of the tubes.

Referring again to Fig. 4, curve 83 is shown, by way of comparison. This latter curve represents the response around the null point, as given by the usual type of dynamometer. It will be seen that this curve is substantially a straight line, not only close to the null point, but for an indefinite distance in both directions therefrom. The dynamometer exhibits a response according to the well-known formula, IE cos $\theta$, while only the central portion 84 of curve 80 shows a response according to this same formula. Therefore Fig. 4 illustrates graphically the overload protective characteristics of this indicating device, as compared with the characteristics of the conventional dynamometer, which show no such protective features.

While there have been shown a few possible forms in which this invention may be embodied, it is to be understood that many variations of the various elements may be made, without changing the general method of operation. For example, in lieu of using two separate electronic tubes, the various elements may be assembled within a single envelope, constituting a polyfunctional tube. While there has been described the use of this indicating device in connection with phase measurements, it will be apparent to one skilled in the art that measurement of amplitude can likewise be accomplished thereby. Therefore, the scope of this invention is limited only by the hereunto appended claims.

We claim:
1. Indicating device of the character described, including a pair of electronic amplifier tubes, of the hot cathode type, a source of alternating current connected between said cathodes, means for grounding the virtual electrical midpoint of said source, a direct current indicator connected between the anodes of said tubes, two resistors of substantially equal resistance connected one from each anode to the ground, whereby between said cathodes and said anodes of the respective tubes there is developed a difference of phase of substantially 180°, means for connecting the grids of said tubes in parallel with one another, means for connecting said grids to one output terminal of the instrument of which an indication is to be obtained, means for grounding the other output terminal of said instrument, and means for supplying said instrument with alternating current of a phase and frequency harmonically related to the phase and frequency of the alternating current source connected to said cathodes, whereby alternating current appearing between said grids and ground will cause a direct current flow through said indicator connected to said anodes and will indicate phase shift by the direction of said flow, said grids being metallically connected to the respective cathodes through paths of relatively high impedance, whereby sensitivity is maintained at a high level.

2. Indicating device including a pair of electronic discharge tubes having at least three active discharge elements, a source of alternating current connected between the grids of said tubes so as to excite said grids substantially 180° out of phase with one another, means for grounding the midpoint of said source and the cathodes of said tubes, a direct current meter connected between the anodes of said tubes, substantially equal resistors, one connected between each anode and ground, whereby the anodes and grids of said tubes are respectively 180° out of phase, and means coupling said anodes in parallel with one another to the instrument of which indication is desired, said instrument having an output grounded on one side and being fed with alternating current having phase and frequency harmonically related to the phase and frequency of the current source connected to said grids, whereby said direct current meter will indicate out-of-phase current flowing into said anodes from said instrument.

3. Electrical indicating device including two electron tubes, each having at least three elements, comprising a cathode, an anode and a control grid, means for exciting at least one pair of similar elements in the two tubes with alternating current so that said elements will be substantially 180° out of phase with respect to each other, means for connecting a second pair of similar elements in the two tubes in parallel with one another with respect to current to be indicated, which last current is harmonically related, as to phase and frequency, to said first current, means for applying said current to be indicated between said parallel connected pair of elements and the midpoint of said first current, a direct current meter connected directly and metallically between the anodes of the tubes so as to be deflected by direct current unbalance of the tubes caused by said current to be indicated, and adjustable resistances interposed in the respective circuits from the anode to the cathode of each tube, whereby direct current flow in said circuits can be matched, said parallel connected elements being connected to the respective cathodes through paths presenting relatively high impedances to said current to be indicated.

4. Indicating device of the character described, including a pair of electronic amplifier tubes, each tube including at least one cathode, one anode, and one control grid, a source of alternating current connected between said cathodes, means for grounding the virtual electrical midpoint of said source, a direct current indicator directly and metallically connected between the anodes of said tubes, an anode feed source of alternating current, connected so that said anodes are fed substantially 180° out of phase with one another, said last mentioned source having phase and frequency harmonically related to the phase and frequency of the current source connected to said cathodes, two resistors of substantially equal resistance connected one from each anode to a respective terminal of said anode feed source, a ground connection to the midpoint of said anode feed source, whereby the potentials to ground of said anodes may be determined independently of the potentials to ground of said cathodes, means for connecting the grids of said tubes in parallel with one another, means for connecting said grids to one output terminal of the instrument of which an indication is to be obtained, means for grounding the other output terminal of said instrument, and means for supplying said instrument with alternating current of a phase and frequency harmonically related to the phase and frequency of the alternating current source connected to said cathodes, whereby alternating current appearing between said grids and ground will cause a direct current flow through said indicator connected to said anodes and will indicate phase shift by the direction of said flow.

JOHN M. van BEUREN.
ELTON CONRAD.

REFERENCES CITED

The following references are of record in the file of this patent:

UNITED STATES PATENTS

| Number | Name | Date |
|---|---|---|
| 1,586,533 | Peterson | June 1, 1926 |
| 1,728,835 | Petch | Sept. 17, 1929 |
| 2,054,125 | Herold | Sept. 15, 1936 |
| 2,154,375 | Chambers | Apr. 11, 1939 |
| 2,338,732 | Nosker | Jan. 11, 1944 |

OTHER REFERENCES

"Alternating Current Bridge Methods," by Hague, 4th edition, 1938, pages 244–246.